(12) United States Patent
Brizendine et al.

(10) Patent No.: US 9,571,991 B1
(45) Date of Patent: Feb. 14, 2017

(54) OPT-IN TRACKING ACROSS MESSAGING APPLICATION PLATFORMS

(71) Applicant: Sprint Communications Company L.P., Overland Park, KS (US)

(72) Inventors: Namfon Brizendine, Shawnee, KS (US); Tae-Woo Cha, Overland Park, KS (US); Michael A. Gailloux, Overland Park, KS (US); Adam Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/065,849

(22) Filed: Mar. 9, 2016

(51) Int. Cl.
| | | |
|---|---|---|
| *H04W 4/00* | (2009.01) | |
| *H04W 4/12* | (2009.01) | |
| *H04L 12/58* | (2006.01) | |
| *H04L 12/46* | (2006.01) | |
| *G06Q 20/02* | (2012.01) | |
| *G06Q 20/42* | (2012.01) | |
| *G06Q 20/32* | (2012.01) | |

(52) U.S. Cl.
CPC .............. *H04W 4/12* (2013.01); *G06Q 20/027* (2013.01); *G06Q 20/3255* (2013.01); *G06Q 20/42* (2013.01); *H04L 12/46* (2013.01); *H04L 51/36* (2013.01)

(58) Field of Classification Search
CPC ... H04W 4/12; G06Q 20/3255; G06Q 20/027; G06Q 20/42; H04L 12/46; H04L 51/36
See application file for complete search history.

(56) References Cited

U.S. PATENT DOCUMENTS

| | | | | |
|---|---|---|---|---|
| 8,325,642 | B1* | 12/2012 | McHenry | H04W 4/12 370/310 |
| 2009/0109978 | A1* | 4/2009 | Zhu | H04L 12/5895 370/395.52 |
| 2009/0248533 | A1* | 10/2009 | Colemen | G06Q 20/32 705/26.1 |
| 2011/0213671 | A1* | 9/2011 | Hirson | G06Q 20/10 705/16 |
| 2013/0273882 | A1* | 10/2013 | Walsh | H04W 4/26 455/407 |
| 2015/0026477 | A1* | 1/2015 | Malatack | G06F 9/541 713/176 |

* cited by examiner

*Primary Examiner* — Ajit Patel

(57) ABSTRACT

The systems and methods discussed herein enable telecommunications service providers to track opt-ins (consent) to premium service and goods purchases. An industry aggregator gateway may be employed to receive short codes in messages built by IP messaging applications capable of data transmission, and may transmit the messages to telecommunications service providers and receive purchase information associated with various short codes. At least some of this purchase information is displayed to users to obtain consent to the purchase, and the consent trail from the request to the acceptance of purchase information, including terms and charges, is tracked and stored.

19 Claims, 6 Drawing Sheets

OPT-IN TRACKING ACROSS MESSAGING APPLICATION PLATFORMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers support short code messaging services, short codes are associated with premium services that are not included in standard service packages offered by the telecommunications service providers and subscribed to by the owners of user equipment. Short codes may be strings of numbers and/or characters, these strings are shorter than standard 10-digit telephone numbers and may be unique to a telecommunications service provider or may be shared by multiple telecommunications service providers. The length of short codes may differ among and between countries. In the United States, short codes shared by multiple providers may be five characters long or greater, and short codes that are carrier specific may be 4 digits, while short codes for emergency services may be 3 digits. Charges incurred due to these premium services may be reflected in a subscriber's bill or other balance of voice and data services that may be tracked and maintained by the telecommunications service provider.

SUMMARY

These and other features will be more clearly understood from the following detailed description taken in conjunction with the accompanying drawings and claims.

In an embodiment, a system for tracking consent for purchases using short codes, comprising: an industry aggregator gateway (IAG) comprising a plurality of application programming interfaces (APIs) and a gateway application stored in a non-transitory memory and executable by a processor, wherein each API of the plurality of APIs is associated with a different telecommunications service provider; a telecommunications messaging gateway (TMG) associated with a telecommunications service provider; an identity service system (ISS) associated with a telecommunications service provider and comprising information associated with the telecommunications provider; and user equipment comprising an IP messaging application stored in a non-transitory memory of the user equipment and executable by a processor on the communication device. The embodiment further comprising: wherein the IAG, TMG, ISS, and communication device are in communication via a network; wherein the gateway application: receives, from the IP messaging application, via the network, a request to purchase premium services, wherein the request comprises a short code and a plurality of information associated with the communication device; sends, based on the request, a purchase information request to the ISS; receives, in response to the purchase information request, from the ISS, a plurality of purchase information; transmits the plurality of purchase information to the IP messaging application, wherein the IP messaging application is configured to display at least some of the plurality of purchase information on a graphical user interface; receives, from the IP messaging application, in response to the display of the plurality of purchase information, a consent message, wherein the consent message comprises a consent to one of charges or service plan usage associated with the requested purchase of premium services; sends the consent message to at least one of the ISS and the TMG, wherein the consent message is stored by the at least one of the ISS and the TMG.

In an embodiment, a method of obtaining and tracking opt-in consent from IP messaging applications, comprising: receiving, by a gateway application stored in a non-transitory memory of an industry aggregator gateway (IAG), from an IP messaging application stored in a non-transitory memory of user equipment, a request to purchase premium services, wherein the IAG comprises a plurality of application programming interfaces (APIs), and wherein the request comprises a short code and a plurality of information associated with the user equipment; determining, by the gateway application, based on the plurality of information and in response to a determination that the user equipment was not previously assigned a token, a telecommunications service provider associated with the user equipment; and sending, by the gateway application, a purchase information request to the ISS associated with the determined telecommunications service provider. The embodiment further comprising: receiving, by the gateway application, from the ISS, in response to the purchase information request, a plurality of purchase information associated with the short code; transmitting, by the gateway application, the plurality of purchase information to the IP messaging application for display on the user equipment; receiving, by the gateway application, from the IP messaging application, a consent message; and sending, by the gateway application, the consent message to at least one of the ISS and a telecommunications messaging gateway (TMG), wherein the TMG is associated with the telecommunications provider, and wherein the sending of the consent message by the gateway application completes the purchase request.

In an embodiment, a system for obtaining and tracking opt-in consent from IP messaging applications using short codes, comprising: an industry aggregator gateway (IAG) comprising a plurality of application programming interfaces (APIs) and a gateway application stored in a non-transitory memory and executable by a processor, wherein each API is associated with a telecommunications service provider; a telecommunications messaging gateway (TMG) associated with a telecommunications service provider and comprising a consent application executable by a processor; an identity service system (ISS) comprising a plurality of data stores of information comprising links between a plurality of subscribers, a plurality of service plans, and a plurality of user equipment; an option records data store comprising consent records associated with the plurality of subscribers and the plurality of user equipment; user equipment of the plurality of user equipment, and wherein the user equipment comprises at least one IP messaging application stored in a non-transitory memory and executable by a processor on the user equipment, wherein the IAG, TMG, ISS, user equipment, and option records data store are configured to communicate via a network. The embodiment further comprising: wherein the gateway application: receives, from the IP messaging application, via the network, a purchase request comprising a short code and a plurality of information associated with the user equipment; determines, based on the purchase request, a telecommunications service provider associated with the user equipment; sends a request for purchase information, comprising the short code, to the ISS associated with determined telecommunications service provider; receives, from the ISS, based on the short code, the purchase information; transmits the purchase information to the IP messaging application; receives, from the IP messaging application, a consent message from the IP messaging application; sends the consent message to a TMG associated with the determined telecommunications service provider; and receives a confirmation in response to the consent message from the TMG, wherein the confirmation completes the purchase request.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
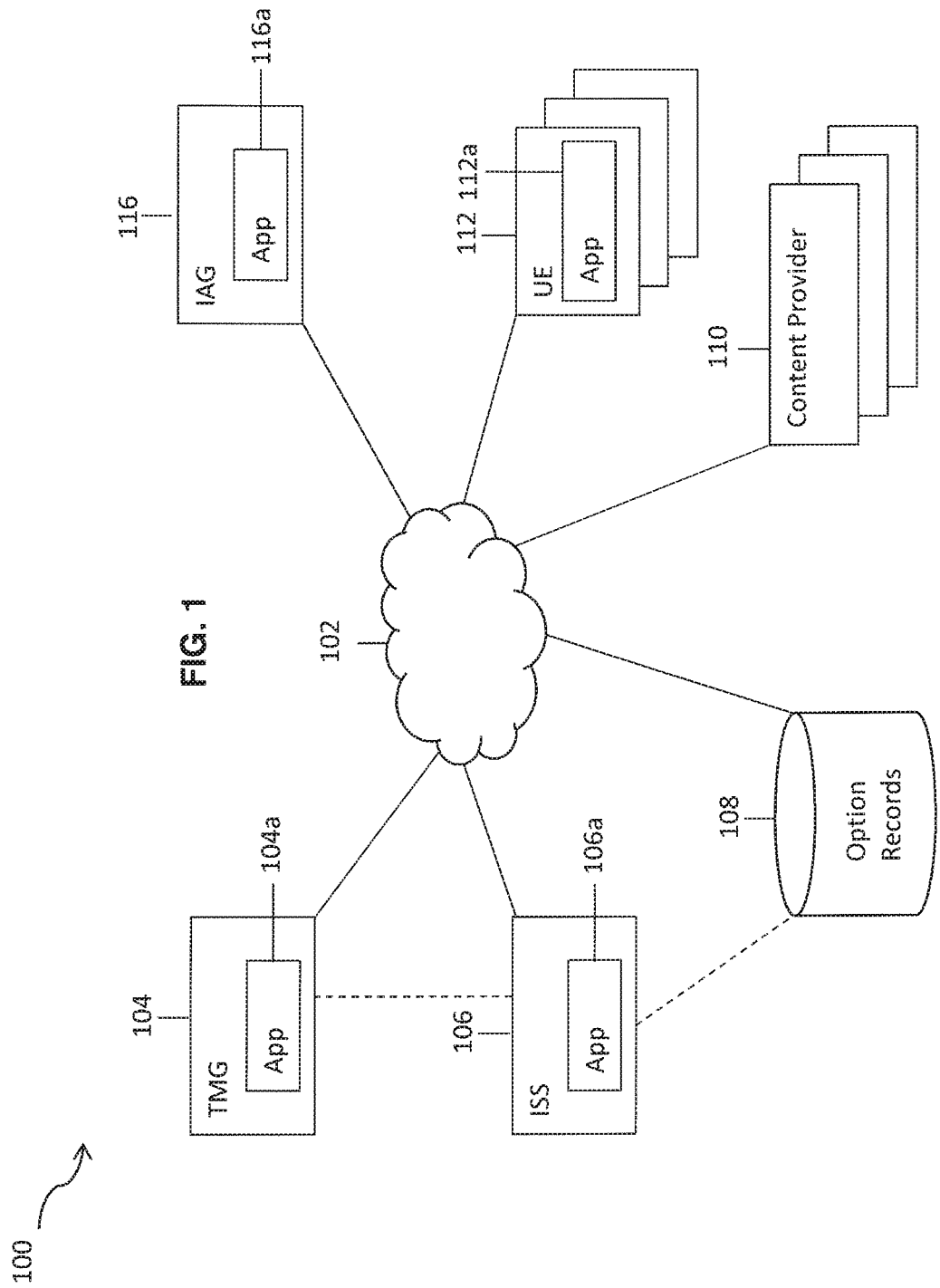
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Various types of user equipment (UE) may be configured to use short messaging services (SMS) and multimedia messaging services (MMS). Increasingly, in addition to those forms of messaging, users have the option to download and/or subscribe to internet protocol (IP) messaging services in the form of applications provided by a telecommunications service provider (which may be referred to as native IP messaging applications or more simply as native messaging applications) and in the form of applications provided by third party vendors (e.g., not by the telecommunications service provider) which may be referred to as third party IP messaging applications or vendor messaging applications. IP messaging (either native or vendor messaging) may be preferred by some users and application developers due to the increased functionality as compared to some SMS and MMS systems. The term "IP messaging" may be employed herein to discuss messaging services including applications developed and/or supported by the telecommunications service provider or by parties other than a telecommunications service provide and which support data messaging. These IP messaging services rely on message transmissions that are sent using TCP/IP data links. SMS and MMS messaging programs may employ short codes which are shorter than standard 10-digit telephone numbers and may be unique to a telecommunications service provider or may be shared by multiple telecommunications service providers.

The use of short codes is tracked by telecommunications service providers in the United States in order to demonstrate compliance to the rules and regulations associated with opting-in (consenting) to additional charges, and telecommunications service providers may be audited by government bodies or third parties to show compliance to the tracking and storing of consent to additional charges or plan usage. The short codes may each be associated with programs of purchase information, and this association or link may be stored in a database. Each program or type of purchase information is displayed to a user in order to obtain consent to additional charges or plan usage. The purchase information may differ between different telecommunications service providers, different premium services providers, purchase types, purchase amounts, purchase occurrence (single or recurring), or other aspects of premium services that may impact a plurality of information that the telecommunications service provider displays to a user aside from a one-time or recurring cost of purchase. For example, a short code associated with the purchase of a VIP pass to a sporting event for $100 may be associated with a first plurality of information, that may be referred to as purchase information, and a short code associated with the purchase of a $1 song or gaming add-on may be associated with a second plurality of information that is different than the first plurality of information. As a part of demonstrating compliance to this law, telecommunications service providers track and store the users' consent ("opt-in") to premium services that result in charges and/or plan usage. A premium service may be a service or good or a combination of services and goods that is not included in a service plan, and/or that which would incur data or other plan usage beyond what is considered "normal" use and therefore requires, under government regulations, an opt-in.

Various opt-in methods may be used that allow a user to opt-in from a handset or from another device, and opt-ins may be for a single purchase, a series of purchases, or all purchases from a particular application or a particular device. The tracking and storing of opt-ins may be used, in addition to showing compliance to government regulations, to prevent fraudulent purchases and to notify users when a purchase attempt is made on a device or in a particular messaging application, for example, if a user account is tied to multiple devices in a corporate or family plan. As such, telecommunications service providers add value to a user's experience in addition to establishing compliance to government regulations by validating the user's intention to purchase a premium service using a secondary consent and by identifying the customer and UE correctly.

Currently, IP messaging applications stored on various types of user equipment may not comprise the functionality to use or access short codes, and/or may be unable to communicate with the telecommunications service provider even if a short code is associated with access to premium services. This may not typically be a problem for native messaging applications, because the telecommunications service provider controls the development of these native messaging applications and can assure that the functionality to use or access short codes be built into those native messaging applications—either by its own engineering staff or by contracted vendors working to the requirements specifications provided by the telecommunication service provider. When third party messaging applications (not coordinated by the telecommunication service provider) are installed on the UE, however, such functionality may not be included. The focus of the following disclosure is directed to this kind of third party messaging applications, although the teachings may equally be applied to native applications. The systems and methods discussed herein bridge the IP messaging application and SMS/MMS platforms to enable the use of short codes in vendor messaging applications and the ability of telecommunications service providers to track and store information related to these codes as required by federal regulations. Using the systems and methods discussed herein, users may purchase or decline to purchase premium services offered through IP messaging applications. The telecommunications service provider can track and store these transactions, including opt-ins, in a manner compliant with government regulation. In various embodiments, telecommunications service carriers expand carrier billing payment methods to use with IP messaging (in contrast to SMS and MMS native messaging clients provided by the provider on the UE), and to track billing opt-ins in order to comply with government regulations.

In some embodiments, short codes may be shared by telecommunications service provider, and in other embodiments, short codes may be unique to individual telecommunications service providers. Short codes are employed for access to premium services, which may also be referred to as "value-added" services, because the premium services may not be included in packages offered by the telecommunications service provider. These packages, which may be referred to as bundles or service plans are contractual agreements between users and the telecommunications service provider and may be pre-pay, post-pay, or pay-as-you-go agreements, any of which does not include the use of premium services. The service plans may comprise various combinations allotments (amounts) included in a monthly or other period charge, these allotments may be associated with voice and data services associated with a user account. In some embodiments, a service plan may be specific to a single device (piece of user equipment) associated with a user account, and in alternate embodiments it may be associated with multiple pieces of user equipment associated with a user account. For voice and data services beyond these allotments for a given time period, or for the use of premium services or offers not included in the service plan, the user may be able to pay a fee for access. Therefore, use of the premium services may result in additional charges on a bill or use of voice or data allotments associated with various service plans, and telecommunications service providers are required by law to track these opt-ins to charges.

An "opt-in" to charges may comprise consent to accept additional charges on a future bill, consent to immediate payment/charge for services, and/or consent to an amount of service plan (allotment) usage. Each telecommunications service provider has a plurality of purchase information associated with one or more short codes that may be displayed to users who are making purchases of premium services. This purchase information may provide information about the service(s) being purchased, an opt-in for reminders associated with purchase, the price/plan usage involved in purchase, the method of charge (immediate, future bill, service plan usage), or other information. The consent generated using the systems and methods discussed herein is recorded and stored by at least the telecommunications service provider and the application through which the request is made. This consent may be used to generate an audit trail to show compliance with government mandates associated with the use of short codes to track opt-ins, and the purchase information associated with premium service requests may be based in part on the short code involved in the request to purchase premium services. The purchase information may also be associated with a service plan type, a requesting device type, an operating system version, a type of premium services requested, and a cost or a range of cost options associated with consenting to purchase of the premium services.

In an embodiment, an aggregation (a set) of APIs act as an intermediary between user equipment and applications stored on the user equipment and the telecommunications service providers' APIs. This aggregation shelters the telecommunications service providers' information and systems as well as provides a standard interface for content providers. Content providers may be vendors and developers of IP messaging applications or other applications, including telecommunications service providers. Content providers may comprise third parties other than telecommunications service providers such as retail, sports, entertainment, or other entities that may offer services and opportunities to UE users based on user profiles associated with IP messaging applications or other information. These offers may be made by way of an IP messaging application. In one example, a sports organization may have playoff packages that include tickets to the game or games, hotel, airfare, and a meet and greet with players. The sports organization contracts with another party, for example, an owner or developer of an IP messaging application, to present this offer to users by way of the messaging application. This offer falls outside of the services/applications included in service plans, so a user would have to opt-in and receive a notification of the additional charges as well as confirm acceptance (consent) to the additional charges. In some embodiments, a user may have the option of opting in to all offers presented by the third party and/or through the IP messaging application based upon a previous confirmation, as discussed in detail below.

In an embodiment, a user receives an offer from a content provider that includes a short code, enters/copies this short code in a message built using an IP messaging application stored on their UE, and the IP messaging application sends the message including the short code and information associated with the sending UE. The IP messaging application sends the received message to an API aggregator, which may be referred to as an industry aggregator gateway ("IAG"). The IAG comprises a plurality of APIs associated with a plurality of telecommunications service providers and comprises an application that receives the message from the IP messaging application. The IAG determines, based on the short code and the information associated with the sending UE, which telecommunications service provider is associated with the UE by determining the device from which the request originated. In some embodiments, the IAG may send a message to the IP messaging application on the UE to request a security token that may be used for authentication. A security token may be obtained from the UE, for example, from a secure memory partition or secure element of the UE, by the IAG. The security token may be assigned based upon previous opt-ins from the same IP messaging application or by other means, and may be periodically refreshed. The security token may be used to verify the identity of the requesting device, for example, using the ISS and TMG discussed below, and/or may be used to automatically approve purchase request from IP messaging applications based upon previous opt-ins from the same device, same IP messaging application making the request, the short code, the type of purchase request, etc.

In one example, when no token is available, the IAG may initiate a process to (1) obtain consent to the purchase of premium services and (2) store/record that consent to comply with government regulations and corporate procedures. The IAG may first determine, based upon information received from the IP messaging application that includes information about the UE from which the request was sent, the telecommunications service provider associated with the UE. Once this determination is made, the IAG may communicate with the identity service system (ISS) associated with that telecommunications service provider. The ISS may provide, based on the short code, a plurality of purchase information to be sent to the IP messenger application. This purchase information is displayed for the user to approve, and comprises the information, including cost or service plan usage information, that the user reads before consenting (opting in) to the purchase. In an embodiment, the ISS may receive a user-entered passcode, and validate that the passcode is associated with the UE based upon links between the UE and a plurality of information stored in the ISS including a previously stored passcode, which may be stored in information associated with a user account associated with the UE.

In some cases, opting in to a purchase in a particular IP messaging application may enable further purchases based upon a security token or other form of authorization. The ISS provides the information to the IAG, and the presence/assignment of a token may be based upon a service plan associated with the UE or previous requests associated with the UE and/or user account associated with the UE that may be associated with the IP messaging application or other applications by the same content provider. For example, if the service plan allows for $10 worth of "purchases" each billing cycle before charging the user or counting it against an allotment, this may cause a different piece or pieces of purchase information to be sent to the IAG than a service plan that does not have such a caveat. Once the purchase information is sent to the IAG, the IAG routes the information to the IP messaging application which presents the purchase information to the user at least on the requesting UE in order to obtain consent for the purchase of premium services. The IP messaging application may store and record the consent and may also forward the consent to the IAG. The IAG may send this consent, for example in the form of a receipt, to a telecommunications message gateway (TMG), associated with the telecommunications service provider and/or to the ISS. In some embodiments, the TMG may route the consent message to the ISS, or vice-versa. The consent message and associated thread of approvals may be stored by the telecommunications service provider in an option records database as well. The user is then either charged in real-time or receives the charge, including plan usage) on their bill during a subsequent billing cycle.

FIG. 1 illustrates a system 100 configured to track and monitor short codes used in IP messaging services, which thereby supports short-code services under IP communication channels. The system 100 comprises a telecommunications network 102, that is in communication with an Industry Aggregator Gateway (IAG) 116, a Telecommunications Messaging Gateway (TMG) 104, comprising a gateway application 104a, an Identity Service System (ISS) 106, a plurality of IP messaging services (applications) 112a stored on a plurality of user equipment (UE) 112, and with a plurality of content providers 110 that develop and/or support at least the plurality of IP messaging services 112a, as well as other applications that may be stored on the UE 112. The network 102 may comprise one or more public networks, one or more private networks, or combinations thereof. The IAG 116 comprises an aggregation of APIs across multiple telecommunications service providers that enables the sending and receiving of messages from IP messaging services. The IAG 116 integrates the plurality of content providers 110 across multiple telecommunications service providers that support the UE 112 in order to track opt-ins (consent) to premium services purchases, the consent trails of which can be queried and use to illustrate compliance. The ISS 106 stores a plurality of links between a plurality of short codes and a plurality of purchase information messages. The UE 112 may be one of a mobile phone, a personal digital assistant (PDA), a media player, a wearable computer, a headset computer, a laptop computer, a notebook computer, or a tablet computer.

In an embodiment, the TMG 104, is configured to send and receive messages to and from the IAG 116 for example, via the gateway application 104a, and communicates with both the ISS 106 and a data store comprising option records 108 via the network 102. The option records data store 108 comprises a plurality of option or opt-in records which indicate the IP messaging applications or other applications that, based on a user account, stores previous opt-in confirmations (receipts) for auditing purposes. In some embodiments, the ISS may be employed to confirm a security token and the identity of the requesting UE. The TMG 104 may communicate with the ISS 106 to retrieve information based on a request from the IAG 116, and in alternate embodiments, the ISS 106 may communicate with the TMG 104 based on a request from the IAG 116.

In an embodiment, the ISS 106 comprises a plurality of data stores and is associated with the same telecommunications service provider that is associated with the TMG 104. The ISS 106 comprises a plurality of information regarding UE 112 users, including device type, make, model, phone number, MSDN/ISDN number, and other identifying information for UE 112 and the users of the UE 112, as well as links between the UE 112 and the users. In an embodiment, these links are part of user accounts and/or user profiles associated with the account, and a service plan may also be associated with (linked to) each account that indicates the allotment of types of services (voice, data, etc.) as well as a pre- or post-use payment plan. The ISS 106 may also comprise a plurality of purchase information associated with the short codes, as discussed in detail below.

In an embodiment, the IAG 116 is configured to receive requests from applications stored on various types of UE 112, including IP messaging applications 112a. In an embodiment, a content provider 110 provides an opportunity to purchase a premium service to a user of a UE 112 via an IP messaging application 112a. The opportunity may be presented on a graphic user interface of the UE 112 within the application 112a, and may include a short code. The user may click on a link that generates a message within the IP messaging application 112a, or may generate a message within the IP messaging application 112a and enter or paste the short code into the message. The IP messaging application 112a may transmit that message, along with a plurality of information associated with the UE 112, to the IAG 116. The plurality of information may comprise user accounts, opt-in policies, and consent tracking policies associated with the telecommunications provider, since different providers may design different opt-in and consent tracking policies that are compliance to federal regulations, and that may impact what purchase information (discussed below) and subsequent reminders are displayed to the requesting UE 112. Opt-in policies may be the policies associated with users opting in to additional charges/plan usage (either within or beyond their service plan limits), and consent tracking policies may be associated with the process of proving consent, including how consent is tracked and stored.

The gateway application 116a may determine a telecommunications service provider associated with the UE 112 based on the plurality of information associated with the UE 112, which may include a telephone number or other device ID. This information may be employed to search for stored links and associations between the UE 112 and a telecommunications service provider that supports the UE. Based on this determination, the IAG 116 may send a request for purchase information to the telecommunications service provider via its ISS 106, which may comprise application 106a. In an alternate embodiment, the IAG 116 may send the request for purchase information to the TMG 104, which may provide the information directly to the IAG 116, which it may retrieve from the ISS 106, or may transmit the message to the ISS 106 and the ISS 106 then sends the purchase information back to the IAG 116.

In an embodiment, the purchase information is looked up in a data store of the ISS 106 using the short code to index and find sent to the IAG 116 is determined based on the short code submitted in the request for purchase of premium services. The purchase information may be based on the short code and may differ among and between different telecommunications service providers even though short codes may be shared by two or more telecommunications service providers. In an embodiment, the purchase information may comprise various advisements of charges and/or plan usage incurred (amount), method of payment, date or date range of payment (current bill, future bill, payment installments), an option to pay in installments, as well as a description of the premium services included in the purchase and in some embodiments.

In some embodiments, the purchase information may comprise what may not be included in the purchase (future purchases, add-ons), as well as the option for add-ons to the purchase of premium services, and cost/plan usage associated with those add-ons. In one example, the request for premium services may include VIP passes to a concert for $88.88 on August 8$^{th}$, and the add-ons may include car service, bottle service, or other services to/from or while at the concert venue for additional charges beyond the $88.88. The purchase information provided for this request may comprise pricing for the premium services as well as add-ons, and may be displayed to the user in order to obtain their consent to charges (opting-in to charges).

In an embodiment, the IP messaging application 112a receives, in response to displaying the purchase information received from the IAG 116, a consent from the user, and the IP messaging application 112a transmits a message comprising the consent to at least one of the UE 112 via the IP messaging application 112a, the content provider 110, the options records 108, the ISS 106, and the TMG 104. In some embodiments, only one of the ISS 106 or TMG 104 may receive the consent message from the IAG 116, for example in the form of a receipt, and store and/or transmit the consent message to the other. Recipients of the consent message from the IAG 116 may store the message, and this opt-in trail from the request for purchase of services through the receipt may be query-able from data stores associated with the content provider 110, the options records 108, the ISS 106, and the TMG 104. In an embodiment, the UE 112 receives a receipt from at least one of the IAG 116, content provider 110, the options records 108, the ISS 106, and the TMG 104.

In some embodiments, this receipt may be stored on the UE 112 and may comprise an executable that causes the display of a reminder and/or additional information (time changes, venue changes, etc.) associated with the purchased premium services. This reminder may be displayed on the date of the event, e.g., August 8$^{th}$, and/or on a date or dates leading up to the event, and may comprise a link or links to information associated with the purchased premium services (event). This reminder may be displayed via the IP messaging application 112a or by another application or service stored on the UE 112, and in some embodiments may be displayed on more than one UE.

The purchase request may be considered complete by the telecommunications service provider and the content provider 110 when the consent message is received by the IAG 116, or in some embodiments, it may be considered complete when the receipt is received by the UE 112 and/or the consent message is stored by at least one of the content provider 110, the options records 108, the ISS 106, and the TMG 104. The user may see charges appear on a subsequent bill, or may see service plan usage on a future bill or in real-time.

Figure 2:
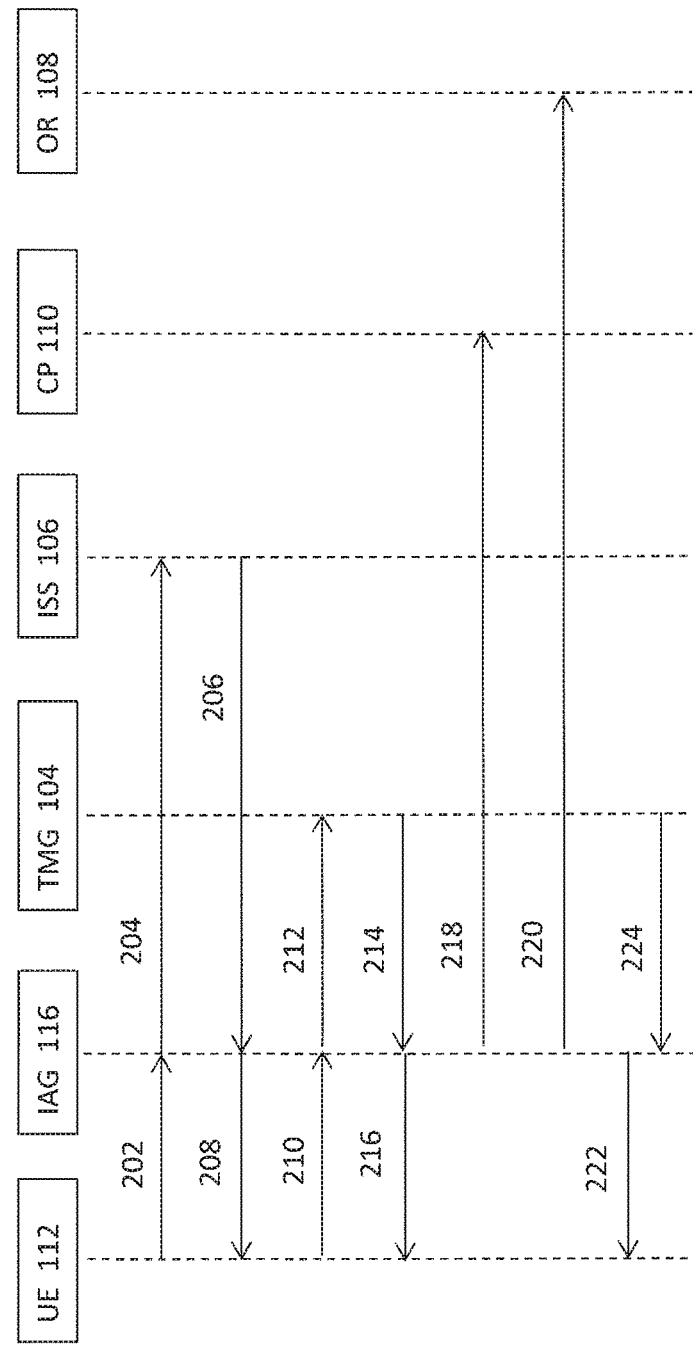
FIG. 2 is a flow chart of a method according to an embodiment of the disclosure.

FIG. 2 is an illustration of a method 200 of a telecommunications service provider tracking and storing opt-ins on IP messaging applications. At block 202, a UE 112 sends a request to the IAG 116 to purchase premium services. This request may be sent by an IP messaging application 112a in response to a user of the UE, who was presented with a short code (on a graphical user interface of the UE) for the purchase of the premium services. The user may copy that short code into a message in an IP messaging application that presented the opportunity for purchase and associated short code. This purchase may be an in-app purchase for services related to the IP messaging application stored on the UE 112, or may be a purchase unrelated to the IP messaging application presenting the purchase opportunity.

In an embodiment, the request sent at block 202 may comprise the short code and a plurality of information associated with the UE 112. The IAG 116 determines, based on at least some of the received plurality of information, a telecommunications service provider associated with the UE 112. The IAG 116 may be configured to access a plurality of telecommunications networks associated with a plurality of UEs, some of those providers may share short codes depending upon the short code. The IAG 116 may links and/or associations between short codes, purchase information, and information associated with UE 112 and other UEs, and the purchase information may be retrieved based upon these links. When the IAG 116 determines the provider associated with the requesting device UE 112, the IAG 116 sends a request at block 204 to the ISS 106 associated with the telecommunications service provider for purchase information to transmit to the UE 112. This purchase information may be specific to a telecommunications service provider, a service plan type, a device, the type of premium services requested, a cost or range of cost options, the IP messaging application used to transmit the request at block 202, or combinations thereof. Different short codes may be associated with various purchase information because different text, pricing, and options may be associated with different premium service purchases, and government or company regulations may govern what is displayed for different service types, purchase amounts, etc.

In an embodiment, at block 206, the ISS 106 transmits the purchase information to the IAG 116. The IAG 116, at block 208, transmits the purchase information to the UE 112, the IP messaging application stored on the UE displays the information to the user, and an opt-in (confirmation of purchase) message is transmitted at block 210 to the IAG 116 in response to a user opting-in to the premium services purchase. The IAG 116 receives the opt-in (consent) message giving consent to charges and/or plan usage and transmits this consent to the TMG 104 at block 212. At block 214, the TMG 104 transmits a receipt to the IAG 116 based on receiving the consent message, and the IAG 116 transmits the receipt to the UE 112 at block 216

The IAG 116, at block 218, may transmit the receipt (evidence of consent to opt-in and associated charges) at block 218 to the content provider 110 and/or the ISS 106, and at block 220 to the options records data store 108 that may be associated with the telecommunications service provider. In alternate embodiments, the IAG 116 may transmit the consent to the ISS 106. The records stored in the method 200 may comprise not only a receipt indicating consent to purchase, but a trail of each interaction and communication involving the purchase request as discussed at least at blocks 202-220 above.

In some embodiments, at block 222, based on the receipt transmitted at block 214 to the IAG 116, a notification associated with the opt-in purchase made based on the request at block 202 may be sent to the UE 112. This notification sent at block 222 may comprise a reminder associated with the purchase and/or a link or other method of accessing content associated with the purchase of premium services completed using short codes in the method 200. The reminder may be displayed without user intervention at a later date, e.g., a date associated with the purchased premium services, and may comprise information or links to information associated with the purchased services such as parking, early arrival, venue, traffic conditions, or other information. In some embodiments, when a receipt is received by the UE at block 222, the user may have the option as to whether or not to opt-in to further notifications, and how those further notifications may be displayed. The short code sent at block 202 is stored as a part of this trail of interactions and communications involving the system 100 in FIG. 1, and an audit trail of the consent process may be retrieved from any of the locations where the information was stored in blocks 214-222. In some embodiments, completion of the request for purchase of premium services at block 202 is completed when the IAG receives the consent message at block 212, and in alternate embodiments, the request is considered complete and consent obtained when the receipt is sent at any of blocks 214-222. In still other embodiments, the request from block 202 is considered complete at block 224, when the TMG sends a confirmation to the IAG that the consent message was received.

Figure 3:
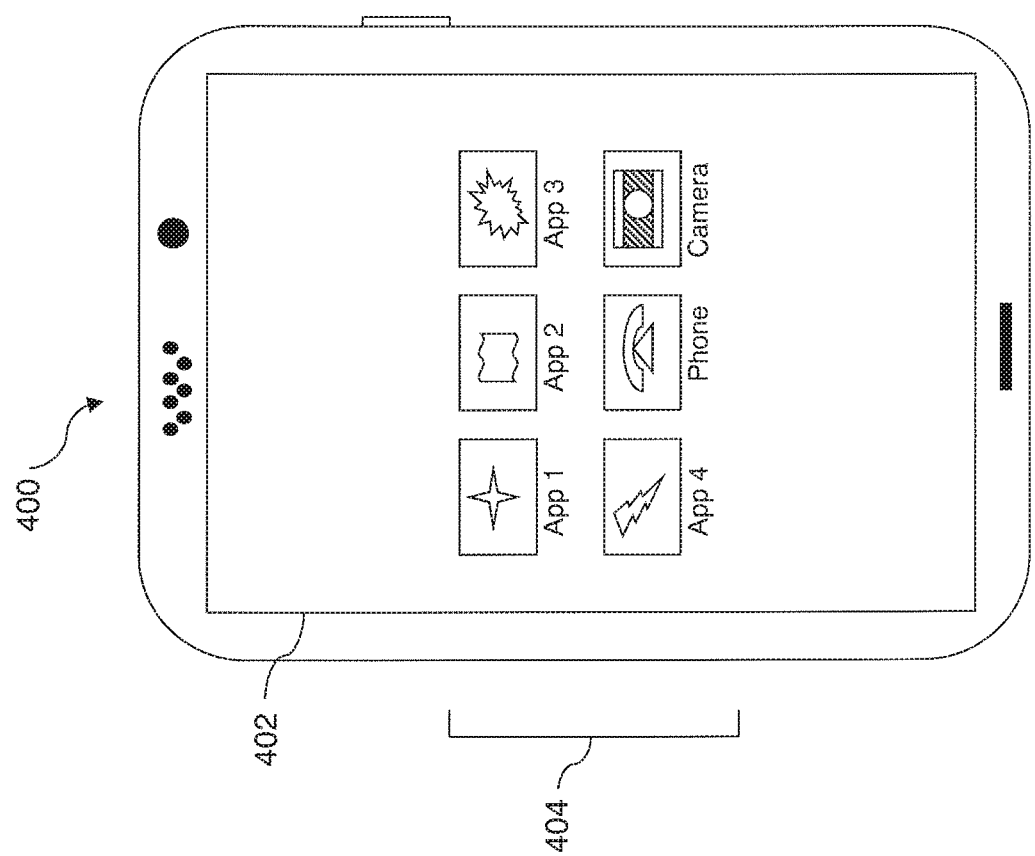
FIG. 3 is an illustration of a handset according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
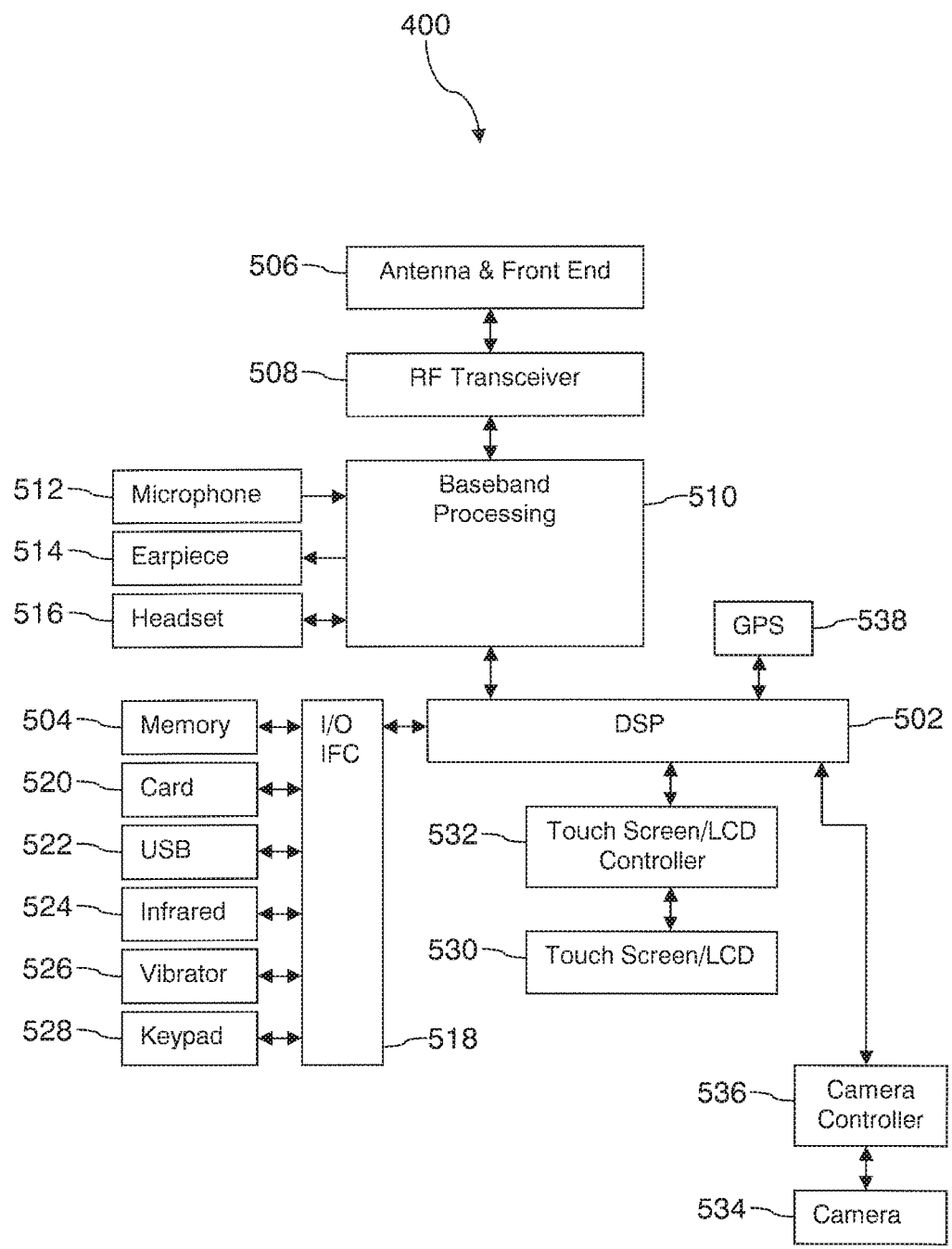
FIG. 4 is a block diagram of a configuration of hardware architecture of a handset according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
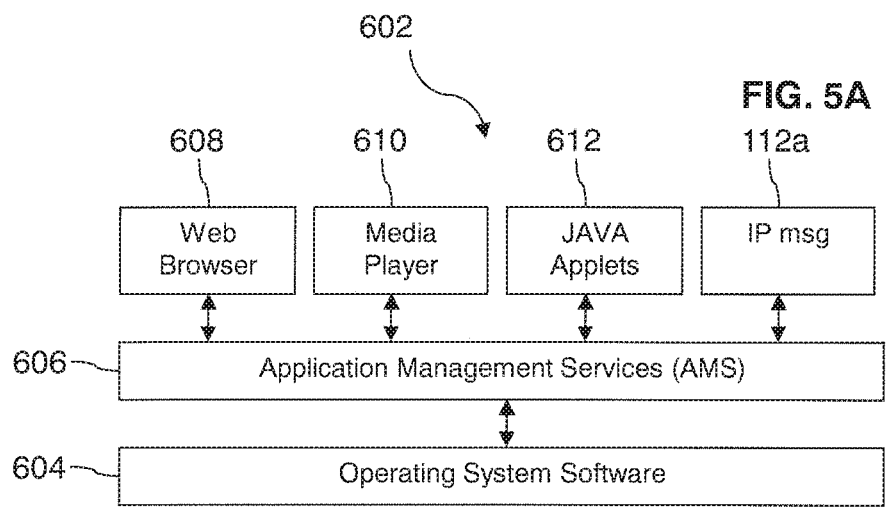
FIG. 5A is a block diagram of a software architecture of a handset according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, IP messaging application 112a, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
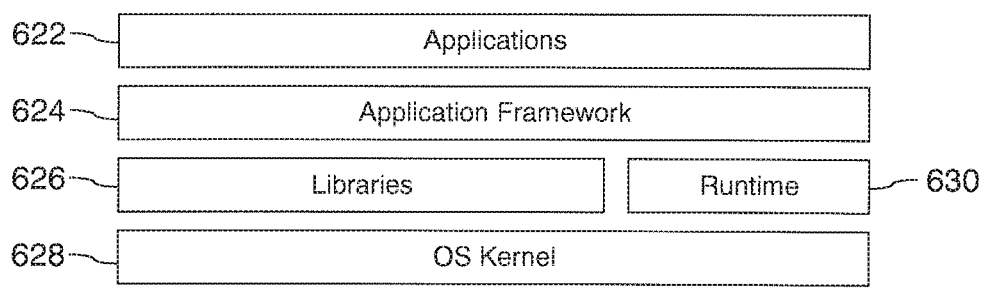
FIG. 5B is a block diagram of another software architecture of a handset according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
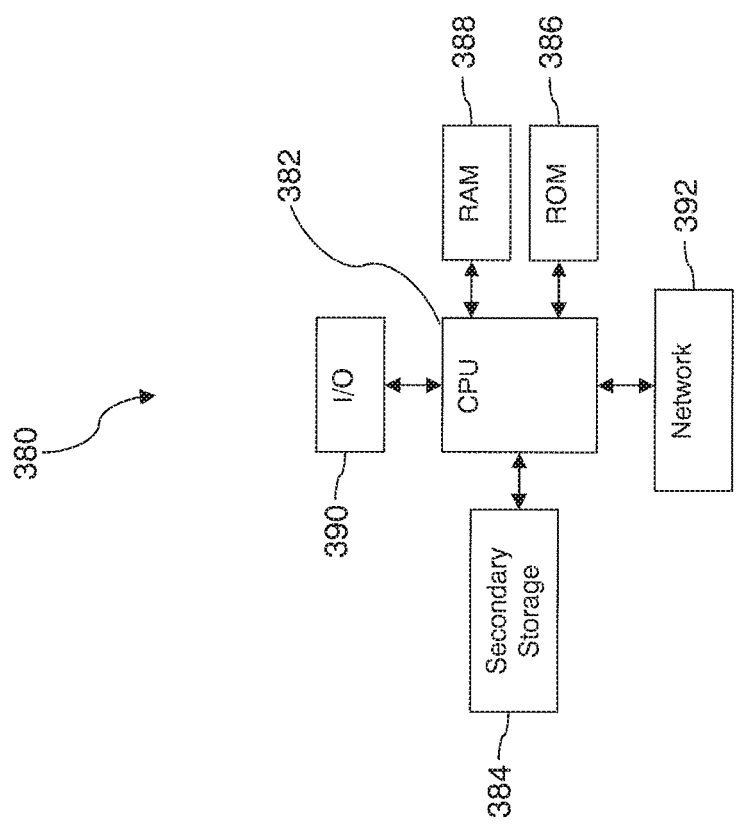
FIG. 6 is a block diagram of a computer system according to an embodiment of the disclosure

FIG. 6 illustrates a computer system 380 suitable for implementing one or more embodiments disclosed herein.

The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for tracking consent for purchases using short codes, comprising:
   an industry aggregator gateway comprising a plurality of application programming interfaces (APIs) and a gateway application stored in a non-transitory memory and executable by a processor, wherein each API of the plurality of APIs is associated with a different telecommunications service provider;
   a telecommunications messaging gateway associated with a telecommunications service provider;
   an identity service system associated with a telecommunications service provider and comprising information associated with the telecommunications service provider;
   user equipment comprising an IP messaging application stored in a non-transitory memory of the user equipment and executable by a processor on the user equipment,
   wherein the industry aggregator gateway, telecommunications messaging gateway, identity service system, and user equipment are in communication via a network; and
   wherein the gateway application:
   receives, from the IP messaging application, via the network, a request to purchase premium services, wherein the request comprises a short code and a plurality of information associated with the user equipment;
   sends, based on the request, a purchase information request to the identity service system;
   receives, in response to the purchase information request, from the identity service system, a plurality of purchase information;
   transmits the plurality of purchase information to the IP messaging application, wherein the IP messaging application is configured to display at least some of the plurality of purchase information on a graphical user interface;
   receives, from the IP messaging application, in response to the display of the plurality of purchase information, a consent message, wherein the consent message comprises a consent to one of charges or service plan usage associated with the requested purchase of premium services; and
   sends the consent message to at least one of the identity service system and the telecommunications messaging gateway, wherein the consent message is stored by the at least one of the identity service system and the telecommunications messaging gateway.

2. The system of claim 1, wherein purchase information request is sent to the identity service system based on a determination that the identity service system is associated with the same telecommunications service provider as the user equipment, wherein the determination is based on the plurality of information associated with the user equipment.

3. The system of claim 2, wherein the identity service system comprises a plurality of links between at least two of a plurality of subscribers, a plurality of user equipment, and a plurality of user accounts associated with the telecommunications service provider.

4. The system of claim 3, wherein each user account is associated with a service plan, and wherein the premium services requested are not included in the service plan.

5. The system of claim 1, wherein the plurality of information associated with the telecommunications service provider comprises user accounts, opt-in policies, and consent tracking policies.

6. The system of claim 1, wherein the gateway application further sends a confirmation to the IP messaging application, and wherein the IP messaging application presents the confirmation on a graphical user interface of the user equipment.

7. The system of claim 1, further comprising an option records data store comprising consent records associated with a plurality of subscribers and a plurality of user equipment, wherein the gateway application sends the consent message to the option records data store, and wherein the consent message is stored in the option records data store.

8. The system of claim 1, wherein the telecommunications messaging gateway comprises a consent application executable by a processor and configured to communicate with the industry aggregator gateway via the network.

9. The system of claim 1, wherein the consent message comprises a trail of interactions between the industry aggregator gateway, telecommunications messaging gateway, identity service system, and IP messaging application initiated by the request to purchase premium services.

10. The system of claim 1, wherein the identity service system comprises purchase information associated with a plurality of short codes, wherein at least some of the plurality of short codes are associated with the telecommunications service provider, and wherein at least other short codes of the plurality of short codes are each associated with at least two telecommunications service providers.

11. The system of claim 1, wherein the user equipment comprises: a wireless handset, a pager, a personal digital assistant (PDA), a gaming device, or a media player.

12. A method of obtaining and tracking opt-in consent from IP messaging applications, comprising:
  receiving, by a gateway application stored in a non-transitory memory of an industry aggregator gateway, from an IP messaging application stored in a non-transitory memory of user equipment, a request to purchase premium services, wherein the industry aggregator gateway comprises a plurality of application programming interfaces, and wherein the request to purchase premium services comprises a short code and a plurality of information associated with the user equipment;
  determining, by the gateway application, based on the plurality of information and in response to a determination that the user equipment was not previously assigned a token, a telecommunications service provider associated with the user equipment;
  sending, by the gateway application, a purchase information request to an identity service system associated with the determined telecommunications service provider;
  receiving, by the gateway application, from the identity service system, in response to the purchase information request, a plurality of purchase information associated with the short code;
  transmitting, by the gateway application, the plurality of purchase information to the IP messaging application for display on the user equipment;
  receiving, by the gateway application, from the IP messaging application, a consent message, wherein the consent message comprises a consent to one of charges or service plan usage associated with the requested purchase of premium services; and
  sending, by the gateway application, the consent message to at least one of the identity service system and a telecommunications messaging gateway, wherein the telecommunications messaging gateway is associated with the telecommunications service provider, and wherein the sending of the consent message by the gateway application completes the request to purchase premium services.

13. The method of claim 12, further comprising determining, by the gateway application, based on the plurality of information, if the user equipment was previously assigned a token associated with the IP messaging application, wherein the request to purchase premium services is granted based upon the token.

14. The method of claim 12, further comprising:
  receiving, by the identity service system, from the gateway application, the purchase information request, wherein the purchase information request comprises a passcode;
  verifying, by the identity service system, the passcode, based on a plurality of information stored in the identity service system, wherein the plurality of information stored in the identity service system is associated with the telecommunications service provider, and wherein the plurality of information stored in the identity service system comprises user accounts, a plurality of user equipment, users, and links between at least two of the user accounts, the plurality of user equipment, and the users.

15. The method of claim 12, wherein the plurality of purchase information received by the gateway application is based on at least two of the telecommunications service provider, a service plan type, a device type, an operating system version, a type of premium services requested, and a cost or a range of cost options associated with consenting to purchase of the premium services.

16. A system for obtaining and tracking opt-in consent from IP messaging applications using short codes, comprising:
  an industry aggregator gateway comprising a plurality of application programming interfaces (APIs) and a gateway application stored in a non-transitory memory and executable by a processor, wherein each API is associated with one of a plurality of telecommunications service providers;
  a telecommunications messaging gateway associated with a telecommunications service provider and comprising a consent application executable by a processor;
  an identity service system comprising a plurality of data stores of information comprising links between a plurality of subscribers, a plurality of service plans, and a plurality of user equipment;
  an option records data store comprising consent records associated with the plurality of subscribers and the plurality of user equipment;
  user equipment of the plurality of user equipment, wherein the user equipment comprises at least one IP messaging application stored in a non-transitory memory and executable by a processor on the user equipment, wherein the industry aggregator gateway, telecommunications messaging gateway, identity service system, user equipment, and option records data store are configured to communicate via a network; and
  wherein the gateway application:
    receives, from the IP messaging application, via the network, a purchase request comprising a short code and a plurality of information associated with the user equipment, wherein the purchase request is associated with a purchase of premium services;
    determines, based on the purchase request, a telecommunications service provider associated with the user equipment;
    sends a request for purchase information, comprising the short code, to the identity service system associated with the determined telecommunications service provider;
    receives, from the identity service system, based on the short code, the purchase information;
    transmits the purchase information to the IP messaging application;
    receives, from the IP messaging application, a consent message, wherein the consent message comprises a consent to one of charges or service plan usage associated with the requested purchase of premium services;
    sends the consent message to a telecommunications messaging gateway associated with the determined telecommunications service provider; and
    receives a confirmation in response to the consent message from the telecommunications messaging gateway associated with the determined telecommunications service provider, wherein the confirmation completes the purchase request.

17. The system of claim 16, wherein the confirmation is associated with the completion of the purchase request.

18. The system of claim 16, wherein the purchase information comprises charges associated with the purchase request.

19. The system of claim 16, wherein the user equipment is associated with a service plan of the plurality of service plans, and wherein the premium services are associated with at least one of service plan usage and charges in addition to charges associated with the service plan.

\* \* \* \* \*